Patented Apr. 17, 1945

2,373,811

UNITED STATES PATENT OFFICE 2,373,811

COMPLEX DITHIOPHOSPHORIC ACID ESTERS

Elmer W. Cook, New York, N. Y., and William D. Thomas, Jr., Stamford, Conn., assignors to American Cyanamid Company, New York, N. Y., a corporation of Maine No Drawing. Application June 5, 1943, Serial No. 489,820

5 Claims. (Cl. 260—461)

This invention relates to complex esters of dithiophosphoric acid and to salts thereof. The invention includes the complex dithiophosphoric acid esters themselves as hereinafter defined, the salts thereof with monovalent and polyvalent metals and other salt-forming bases, and the methods of preparation of said complex esters and their salts.

It is known that simple esters of dithiophosphoric acid are formed by heating 4 molecular proportions of a primary, secondary or tertiary monohydric alcohol or a monohydric phenol with 1 molecular proportion of $P_2S_5$ until the evolution of hydrogen sulphide is substantially completed. It is also known that these simple esters will form salts with mono- or polyvalent metals and other salt-forming bases by agitating the acid ester with a solution or suspension of an oxide, hydroxide or carbonate of the base. It is a principal object of our present invention to provide a class of complex dithiophosphoric acid esters similar in general characteristics to the simple esters that have just been described, but which contain a monocarboxylic acid chemically combined with the dithiophosphoric acid radical. Many of these complex esters and their calcium, barium, zinc and other heavy metal salts have been found to be soluble in lubricating oils and to possess valuable properties as anti-oxidants, detergents and corrosion inhibitors when the lubricating oil is used in the crankcase of an internal combustion engine under heavy duty service conditions.

The complex dithiophosphoric acid esters of the invention are prepared by reacting a mixture of one or more monohydric alcohols or monohydric phenols and one or more monocarboxylic acids with $P_2S_5$ until the evolution of hydrogen sulfide is completed. With alcohols and acids of low molecular weight the reaction takes place with evolution of heat. With higher alcohols and phenols and with the higher and less reactive monocarboxylic acids a moderate amount of heating should be applied. Suitable reaction temperatures are about 90–120° C. In general, at least 2 mols of monohydric alcohol or phenol and one mol of monocarboxylic acid should be used for each mol of $P_2S_5$ and the remaining molecular equivalent may consist entirely of monocarboxylic acid or of monohydric alcohol or phenol or partly of monocarboxylic acid and partly of alcohol or phenol. When the hydrogen sulfide evolution is complete a heat-stable complex is formed in which the monocarboxylic acid radical is chemically combined along with the alcohol or phenol used.

The complex esters prepared by the above-described process are mixed monocarboxylic acid anhydride-alcohol condensation products of phosphorous pentasulfide. The compositions in which less than 2 mols of monocarboxylic acid and more than 2 mols of monohydric alcohol or phenol are condensed with one mol of $P_2S_5$ are probably mixtures, but those in which equimolecular quantities of acid and alcohol or phenol are reacted with $P_2S_5$ are compounds of definite chemical constitution and may be defined by the following structural formula:

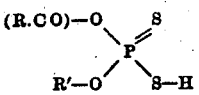

wherein R is the residue of a monocarboxylic acid and R' is the residue of a monohydric alcohol or phenol. This formula, which represents a replacement of one of the alcohol groups of a diester of dithiophosphoric acid by a carboxylic acid, is consistent with the formation of heavy metal salts as well as with the behavior of these salts in crankcase oils.

The complex dithiophosphoric acid esters corresponding to the above formula form salts by simple replacement of the hydrogen of the —SH group with sodium, potassium, ammonium and other salt-forming bases. With divalent metals such as calcium, barium, strontium and zinc two molecules of the complex dithiophosphoric acid radical are combined with each atom of metal, while three such molecules are combined with trivalent metals such as aluminum, etc. Accordingly the compounds of the present invention, including both the free acid esters and their salts, are defined by the formula:

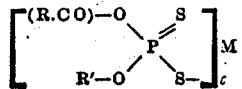

wherein R and R' are as defined above, M is hydrogen or a salt-forming base such as magnesium, nickel, tin, sodium, barium, aluminum, chromium, cobalt or any other suitable metal, or ammonium, quinoline, morpholine and the like, and $x$ is the valence of M. The metal salts are preferably prepared by agitating a reactive oxide, hydroxide or carbonate of the metal with a solution of the complex ester in a mixture of alcohol and toluol. The salts with ammonium and with organic bases are prepared simply by reacting the acid esters with the free base in the presence of a suitable solvent such as alcohol or an alcohol-toluol mixture.

From the foregoing it is evident that any suitable esterifying agents may be used in preparing complex dithiophosphoric acid esters for use in practicing the present invention. Lower aliphatic alcohols which may be used either singly or in admixture are methyl, ethyl, propyl and the various isomeric butyl and amyl alcohols, and particularly the cheap mixtures of amyl alcohols sold commercially as fusel oil and those obtained from low-boiling petroleum fractions and sold as "Pentasol." Higher aliphatic alcohols such as hexyl, heptyl, octyl, nonyl, decyl, lauryl, myristyl, stearyl, oleyl and octadecyl alcohols and the like also may be used, either singly or in admixture.

Certain fractions containing substantial quantities of alcohol mixtures can also be used in preparing compounds representative of the present invention such as, for example, the mixtures of branched-chain alcohols obtained as by-products in the commercial hydrogenation of oxides of carbon in the presence of promoted copper chromite catalysts. Among the most important sources of alcohol mixtures of this type are the so-called "H. T. P." alcohols. One of the most important fractions from this source is the so-called "B–24" alcohol fraction, which has the following composition:

Boiling range _____° C__Approximately 160–200
Specific gravity at 15.6°/15.6° C_____0.8610–0.8660
Weight per U. S. gallon at 68° F_____lbs.__7.17
Saybolt viscosity at 100° F_____seconds__About 32
Solubility in water_____%__Less than 1.0
Solubility in H$_2$SO$_4$—
　　Not less than 85% in 85% H$_2$SO$_4$
Approximate composition:
　Primary alcohols:
　　4-methyl hexanol-1,[1] B. P. about 165° C_____
　　2,4-dimethyl hexanol-1,[1] B. P. about 178° C_____ }--%----45
　　4-methyl heptanol-1,[1] B. P. about 185° C_____
　Secondary alcohols—unidentified____do____34
　Ketones—unidentified _____do____18
　Esters _____do____ 3

[1] Tentative identification; probably other alcohols also present.

Another class of mixed higher branched-chain alcohols that we have found suitable for use in the preparation of complex dithiophosphate heavy metal salt additives for crankcase lubricants are those obtained by the reduction of the corresponding higher aliphatic ketones with hydrogen. Thus, rearrangement of alpha, beta-unsaturated ketones produced by the condensation of ketones of lower molecular weight may be employed. Typical alcohols that can be produced cheaply by the method are 4-methyl hexanol-2, 5-methyl hexanol-3, 4-methyl heptanol-2 and 5-methyl heptanol-3.

In addition to the aliphatic alcohols and alcohol mixtures, the aromatic alcohols such as benzyl alcohol and particularly the phenols form another important class of ester-forming compounds for use in preparing the compositions of the present invention. Phenols such as phenol itself, cresol, xylol and xylenol may be used as well as higher alkyl phenols having larger oil-solubilizing aliphatic groups. Typical phenols of this class are p-tertiary amyl phenol, tertiary butyl phenols and particularly the di-alkyl phenols such as 2,4-dipropyl, dibutyl or diamyl phenols. Complex esters of dithiophosphoric acid with phenols of these classes are both oil-soluble and heat-stable, and when used in the form of their heavy metal salts they possess excellent detergent properties for crankcase oils.

Any saturated organic monocarboxylic acid may be used in admixture with a monohydric alcohol or phenol in preparing the complex dithiophosphoric acid esters of the invention. When improved oil-solubility is desired we prefer to employ cyclic or acyclic monocarboxylic acids which contain oil-solubilizing groups, such as the higher aliphatic monocarboxylic acids, by which term we include all those carboxylic acids of the aliphatic series which contain at least 6 carbon atoms. Representative acids of this class which may be employed are caproic and other isomeric fatty acids of 6 carbon atoms, caprylic, pelargonic, lauric, myristic, palmitic and stearic acids. Saturated fatty acid mixtures obtained from animal and vegetable oils and fats, such as coconut oil and palm oil, may also be used.

Representative saturated and unsaturated cyclic carboxylic acids that may be employed include the naphthenic acids, which are cycloaliphatic monocarboxylic acids of about 8 or 9 to 20 carbon atoms, abietic acid, dihydroabietic acid, benzoic acid, alkyl-substituted benzoic acids and the like.

Where oil-solubility is not of particular importance, lower aliphatic monocarboxylic acids may be employed in admixture with alcohols of relatively low molecular weight, thereby producing esters which contain a higher percentage of phosphorus and sulfur. Representative lower fatty acids that may be employed include acetic acid, proprionic acid, butyric acid and the like, and these may be used in conjunction with lower aliphatic alcohols such as ethyl, propyl, isopropyl and butyl alcohols or in admixture with alcohols of higher molecular weight if desired.

The invention will be illustrated in detail by the following specific examples. It should be understood, however, that although these examples may describe in detail certain of the more specific features of the invention they are given primarily for purposes of illustration, and the invention in its broader aspects is not limited thereto.

*Example 1*

A mixture of 37 parts by weight of n-butanol and 30 parts of acetic acid were slowly added to 60 parts of P$_2$S$_5$, this being a 10% excess of P$_2$S$_5$ over the amount theoretically necessary. The mixture was agitated at about 85—105° C. for 1.5–2 hours, or until the evolution of H$_2$S was complete. The product, a reddish-yellow liquid having the characteristic odor of a dithiophosphoric acid ester, was filtered from the small remaining quantity of P$_2$S$_5$.

21.2 grams of the ester were neutralized by the addition of a water solution containing 4 grams of NaOH followed by evaporation to dryness. The product was a yellow solid that was easily soluble in water.

*Example 2*

50 parts by weight of amyl alcohol, 50 parts of "B–24" alcohol, 21 parts of lauryl alcohol and 40 parts of lauric acid were mixed together and 72 parts of P$_2$S$_5$ were added. The mixture was heated with agitation at 95–105° C. for about 2.5 hours, or until the evolution of H$_2$S was substantially complete. The product was decanted from the small remaining amount of P₂S₅ and was obtained as a reddish-yellow liquid.

215 parts by weight of the complex dithiophosphoric acid ester obtained by this procedure was dissolved in a mixture of 56.5 parts of ethyl alcohol and 125 parts of "Solvesso No. 1" (an aromatic petroleum solvent consisting mainly of toluol) and 44.5 parts of finely ground barium oxide was added to this solution while stirring vigorously and maintaining the temperature at about 30-35° C. After filtering the resulting solution from insoluble matter the alcohol was removed by vacuum distillation, the residue was dissolved in 10-W grade motor oil and the remaining volatile solvent was removed by a second vacuum distillation. The product was obtained as a clear, 50% solution of the barium salt of the complex dithiophosphoric acid ester in lubricating oil.

Example 3

35 parts by weight of fusel oil, 28 parts of lauryl alcohol, 105 parts of palmitic acid and 56 parts of P₂S₅ were reacted by heating together with vigorous agitation at 95-105° C. for about 2 hours, or until the evolution of H₂S was complete.

518 parts by weight of the complex acid ester was dissolved in a mixture of equal parts of ethanol and toluol, filtered, and 83.25 parts by weight of 92% barium oxide was added. After agitation to complete the salt formation at 30-35° C. the insolubles were filtered off and the solution was evaporated under a vacuum and dissolved in a lubricating oil of 10-W grade. The last traces of the toluol were then stripped off by vacuum evaporation. A 50% solution of the product in lubricating oil was clear at ordinary atmospheric temperatures.

Example 4

50 parts by weight of amyl alcohol, 50 parts of "B-24" alcohol and 50 parts of myristic acid were reacted with 75 parts of P₂S₅ by heating as in Example 2. The product was decanted, dissolved in an alcohol-toluene mixture, and the barium salt formed by neutralization with 92% barium oxide on the basis of 448 parts of the complex dithiophosphoric acid ester for each 83.25 parts of added barium oxide. The solvent was driven off and the salt dissolved in lubricating oil of 10-W and 30 grade to form clear 50% solutions as in the preceding examples.

Example 5

A mixture of 50 parts by weight of amyl alcohol, 50 parts "B-24" alcohol and 50 parts of lauric acid were reacted with 76 parts of P₂S₅ as in the preceding example. The equivalent combining weight of the product was determined by its neutralization number as being 340 and therefore the complex dithiophosphoric acid ester was neutralized by adding 83.25 parts by weight of 92% barium oxide for each 340 parts of the acid ester as described above. The product was dissolved in 10-W grade lubricating oil to form a clear 50% solution.

Example 6

50 parts by weight of amyl alcohol, 50 parts of "B-24" alcohol, 21 parts of lauryl alcohol and 40 parts of hydrogenated rosin were mixed with 74 parts of P₂S₅ and the mixture was heated at 110-115° C. for about two hours. After dissolving the product in ethanol and toluene, filtering, and neutralizing by the addition of the theoretical amount of ZnO which was 41 parts by weight of zinc oxide for each 189 parts of the complex ester. The insolubles were filtered off and the solution evaporated under a vacuum and dissolved in lubricating oil to a 40% solution. In the same manner the barium salt was also prepared.

Example 7

Complex esters were prepared containing dichlorostearic acid, p-hydroxy phenyl stearic acid, naphthenic acid and other fatty acids in the manner described in the preceding examples and converted to their heavy metal salts in the usual manner. The reagents employed and the combining weights of the complex dithiophosphoric acid esters formed are shown in the following table wherein the quantities given are in parts by weight:

|  | No. | | | | | | | | | | |
|---|---|---|---|---|---|---|---|---|---|---|---|
|  | 1 | 2 | 3 | 4 | 5 | 6 | 7 | 8 | 9 | 10 | 11 |
| Alcohol: | | | | | | | | | | | |
| Amyl | | | 176 | | | | | | | 35 | 35 |
| Fusel oil | | | | | | | 40 | | | 35 | 35 |
| "B-24" | | | | | | | 40 | | | 28 | 28 |
| Lauryl | 80 | 60 | 70 | 150 | | 20 | 20 | 64 | | | |
| p-Tertiary amyl phenol | | | | | 80 | 80 | | | | | |
| 2,4-diamyl phenol | | | | | | | | | 91 | | |
| Acid: | | | | | | | | | | | |
| Naphthenic | | | | 50 | | | | | | | |
| Myristic | | | | | 100 | 100 | | | | 70 | |
| Palmitic | | | 116 | | | | 20 | 100 | 100 | | |
| 9,10-dichlorostearic | 120 | | | | | | | | | | |
| p-Hydroxy-phenyl-stearic | | 90 | | | | | | | | | |
| P₂S₅ | 47 | 47 | 172 | 62 | 57 | 60 | 60 | 48 | 48 | 77 | 74 |
| Molecular equivalent | 752 | 705 | 378 | 647 | 499 | 505 | 482 | 487 | 534 | 534 | 534 |

The complex dithiophosphoric acid esters prepared as described in this table were converted into their Ba, Ca, Sr and Zn salts, in each case by dissolving the free acid ester in a mixture of equal parts of ethanol and toluene and adding one-half the molecular equivalent of barium oxide, calcium oxide, strontium oxide or zinc oxide, based on the molecular weight of the ester as shown by its neutralization number. The resulting salts were dissolved in lubricating oils and the solutions freed from volatile solvents by heating under a vacuum.

Example 8

Representative samples of the products prepared as described in the preceding examples were tested for efficiency by the Underwood Oxidation test. This test consists in heating 1500 cc. of the oil under test to 325° F. and continuously spraying a portion of the heated oil against a 2" x 10" freshly sanded copper strip and two freshly sanded bearings to be tested for corrosion for five hours while permitting free circulation of air through the apparatus. Samples of the oxidized oil were then examined for specific gravity, neutralization number, and naphtha insoluble and the bearings under test were weighed to determine loss by corrosion. The results were as follows:

| Additive used | Bearing loss, mg. Ag-Cd bearing | Neut. No. | Per cent naphtha insolubles |
|---|---|---|---|
| Control (no additive) | 685 | 5.94 | 0.27 |
| Example 5 | 1 | 0.17 | 0.06 |
| Example 6—No. 1 | 34 | 1.69 | 0.01 |
| Example 6—No. 2 | +1 | 0.62 | 0.01 |
| Example 6—No. 6 | 1 | 0.48 | 0.00 |
| Example 6—No. 9 | 4 | 1.13 | 0.01 |
| Example 6—No. 3: | | | |
| Control | 714 | 7.76 | 0.10 |
| 0.5% Ba salt | 6 | 0.53 | 0.01 |

The oil used in all the above tests was a Mid-Continent-base solvent-refined S. A. E. 10-grade motor oil to which 0.01% $Fe_2O_3$ was added in the form of iron naphthenate. A slightly different oil of the same base was used in testing the product of Example 6—No. 3. In all cases 0.5% of the barium salt of the complex dithiophosphoric acid ester was used in the oil tested.

Iron naphthenate is known to be a powerful promoter of oxidation and decomposition in lubricating oils. Compounds similar to this substance are usually present in engines containing oxidized oil as a result of the attack on the metal by the acidic oxidation products. The effectiveness of the heavy metal salts of complex dithiophosphoric acid esters in overcoming the decomposition caused by iron salts of naphthenic acids is another important advantage of the present invention.

*Example 9*

Another widely used test for accelerated oxidation in crankcase oils is known as the Catlytic Indiana test. The apparatus consists of a constant temperature bath maintained at 341° F. in which a number of large glass test tubes are immersed. 300 cc. samples of the oil under test are poured into these tubes and air at the rate of 10 liters per hour is bubbled through the oil. In order to reproduce the conditions existing in the crankcase of an engine weighed strips of copper-lead alloy are suspended in the oil samples. As metallic surfaces, particularly copper, greatly accelerate the rate of oxidation and decomposition of the oil in the presence of oxygen this is an important factor in the test. Bearing corrosion rates can also be determined by again weighing the strips after 70 hours immersion, which is the usual test period.

The barium salts of representative samples of the complex dithiophosphoric acid esters prepared as described in preceding examples were also evaluated by this test. A Mid-Continent solvent-refined S. A. E. 10-grade oil was used. In all cases except the control the oil contained 1% by weight of the additive. The results are shown in the following table.

| Additive | Bearing loss, mg. Cu-Pb bearing | Tube condition |
|---|---|---|
| None (control) | 302 | Fair. |
| Example 1 | +20 | Good. |
| Example 2 | 10 | Do. |
| Example 6—No. 8 | +21 | Do. |
| Example 6—No. 9 | +28 | Do. |

After completion of the tests the oil was removed and the amount and character of any sludge adhering to the walls of the tubes was noted. In all cases where additive was present in the oil there was only a slight amount of sludge, and these deposits were soft and easily removed by brushing.

This is a continuation-in-part of our copending application Serial No. 452,888 filed July 30, 1942.

What we claim is:

1. A dithiophosphoric acid ester of the formula:

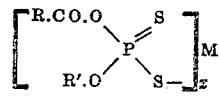

in which R is a saturated hydrocarbon radical, R' is the residue of a member of the group consisting of monohydric alcohols and phenols, M is a member of the group consisting of hydrogen and salt-forming bases, and $x$ is the valence of M.

2. A dithiophosphoric acid ester of the formula:

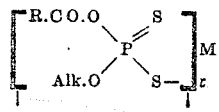

in which R is a saturated hydrocarbon radical, Alk is an alkyl radical, M is a member of the group consisting of hydrogen and salt-forming bases, and $x$ is the valence of M.

3. A dithiophosphoric acid ester of the formula:

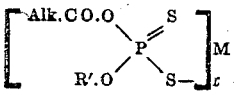

in which Alk is an alkyl radical, R' is the residue of a member of the group consisting of monohydric alcohols and phenols, M is a member of the group consisting of hydrogen and salt-forming bases, and $x$ is the valence of M.

4. A dithiophosphoric acid ester of the formula:

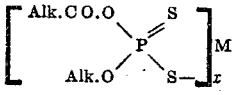

in which each Alk is an alkyl radical, M is a member of the group consisting of hydrogen and salt-forming bases and $x$ is the valence of M.

5. A method of producing a complex dithiophosphoric acid ester of the formula

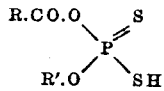

in which R is a saturated hydrocarbon radical and R' is the residue of a member of the group consisting of monohydric alcohols and phenols which comprises reacting with $P_2S_5$ an equimolecular mixture of a saturated unsubstituted monocarboxylic acid and a member of the group consisting of monohydric alcohols and phenols until evolution of hydrogen sulfide is completed.

ELMER W. COOK.
WILLIAM D. THOMAS, JR.